United States Patent
Bae et al.

(10) Patent No.: US 9,418,306 B2
(45) Date of Patent: Aug. 16, 2016

(54) IRIS RECOGNITION DEVICE AND MOBILE DEVICE HAVING THE SAME

(71) Applicant: SAMSUNG ELECTRONICS CO., LTD., Suwon-si (KR)

(72) Inventors: Kwang-Hyuk Bae, Seoul (KR); Tae-Chan Kim, Yongin-si (KR); Seong-Yeong Jeong, Daegu (KR); Shung-Han Cho, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 1 day.

(21) Appl. No.: 14/531,227

(22) Filed: Nov. 3, 2014

(65) Prior Publication Data

US 2015/0269419 A1 Sep. 24, 2015

(30) Foreign Application Priority Data

Mar. 24, 2014 (KR) ........................ 10-2014-0034196

(51) Int. Cl.
| G06K 9/36 | (2006.01) |
| G06K 9/40 | (2006.01) |
| G06K 9/00 | (2006.01) |
| G06K 9/20 | (2006.01) |

(52) U.S. Cl.
CPC .............. *G06K 9/40* (2013.01); *G06K 9/0061* (2013.01); *G06K 9/00604* (2013.01); *G06K 9/2027* (2013.01)

(58) Field of Classification Search
USPC ........... 351/208; 382/115–118, 154, 190–195
See application file for complete search history.

(56) References Cited

U.S. PATENT DOCUMENTS

| 4,595,990 | A | * | 6/1986 | Garwin | A61B 3/113 708/141 |
| 4,816,664 | A | * | 3/1989 | Schaefer | G02B 7/343 250/201.2 |
| 5,432,863 | A | * | 7/1995 | Benati | G06K 9/0061 382/117 |
| 5,481,302 | A | * | 1/1996 | Yamamoto | H04N 9/735 348/223.1 |
| 5,990,973 | A | * | 11/1999 | Sakamoto | G06K 9/0061 348/246 |
| 6,084,227 | A | * | 7/2000 | Rhoads | G01J 9/00 250/201.9 |
| 6,152,563 | A | * | 11/2000 | Hutchinson | A61B 3/113 351/209 |
| 6,169,766 | B1 | * | 1/2001 | Aoki | G06T 7/2026 348/699 |
| 6,233,003 | B1 | * | 5/2001 | Ono | H04N 13/021 348/47 |

(Continued)

FOREIGN PATENT DOCUMENTS

| JP | 2008-027062 A | 2/2008 |
| KR | 10-2012-0074358 A | 7/2012 |

OTHER PUBLICATIONS

Arvacheh et al. "Iris Segmentation: Detecting Pupil, Limbus and Eyelids" Image Processing, 2006 IEEE International Conference on Oct. 2006, pp. 2453-2456.*

(Continued)

*Primary Examiner* — Chan Park
*Assistant Examiner* — Mia M Thomas
(74) *Attorney, Agent, or Firm* — Sughrue Mion, PLLC (57) ABSTRACT

An iris recognition device, a mobile device having the same, and a method of biometric authentication using the same are provided. The iris recognition device includes: a light source unit configured to transmit a light signal to an iris; and a light source receiver configured to receive a reflected light signal of an image of the iris from the iris, and remove an offset of the reflected light signal, corresponding to noise in the iris image, using a plurality of reference signals having different phases.

20 Claims, 9 Drawing Sheets

(56) References Cited

U.S. PATENT DOCUMENTS

| | | | | |
|---|---|---|---|---|
| 6,578,962 | B1* | 6/2003 | Amir | G06K 9/0061 345/157 |
| 7,433,046 | B2* | 10/2008 | Everett | A61B 3/1005 356/479 |
| 7,697,750 | B2* | 4/2010 | Simmons | G02C 7/16 345/419 |
| 7,809,171 | B2* | 10/2010 | Solinsky | G06K 9/00248 382/115 |
| 8,092,021 | B1* | 1/2012 | Northcott | A61B 3/1015 351/206 |
| 8,693,784 | B2* | 4/2014 | Kadoya | G06K 9/00597 382/117 |
| 8,824,779 | B1* | 9/2014 | Smyth | G06K 9/0061 382/100 |
| 9,235,733 | B2* | 1/2016 | Birdwell | G06K 5/00 |
| 2002/0171842 | A1* | 11/2002 | Dicarlo | G01N 21/55 356/445 |
| 2005/0084179 | A1 | 4/2005 | Hanna et al. | |
| 2005/0200940 | A1* | 9/2005 | Emer | G03F 7/706 359/299 |
| 2005/0207614 | A1* | 9/2005 | Schonberg | G06K 9/00597 382/100 |
| 2005/0281475 | A1* | 12/2005 | Wilson | G06F 3/0421 382/254 |
| 2006/0146283 | A1* | 7/2006 | Baumann | A61B 3/113 351/208 |
| 2007/0013785 | A1* | 1/2007 | Kinoshita | H04N 5/2357 348/222.1 |
| 2007/0140531 | A1* | 6/2007 | Hamza | G06K 9/00597 382/117 |
| 2008/0044063 | A1* | 2/2008 | Friedman | A61B 3/1216 382/117 |
| 2008/0199073 | A1* | 8/2008 | Demandolx | G06K 9/0061 382/167 |
| 2008/0253622 | A1* | 10/2008 | Tosa | G06K 9/00604 382/117 |
| 2008/0259275 | A1* | 10/2008 | Aoki | A61B 3/113 351/210 |
| 2009/0208064 | A1* | 8/2009 | Cambier | G06K 9/0061 382/110 |
| 2009/0220126 | A1* | 9/2009 | Claret-Tournier | G06K 9/0061 382/117 |
| 2009/0304234 | A1* | 12/2009 | Kondo | G06T 7/204 382/103 |
| 2010/0001926 | A1* | 1/2010 | Amirparviz | A61B 5/1455 345/7 |
| 2010/0278394 | A1* | 11/2010 | Raguin | G06K 9/00604 382/117 |
| 2010/0328194 | A1* | 12/2010 | Inoe | H04N 13/0438 345/8 |
| 2011/0032365 | A1* | 2/2011 | Yett | G02B 27/2235 348/207.1 |
| 2011/0237999 | A1* | 9/2011 | Muller | A61F 9/008 604/20 |
| 2012/0026346 | A1* | 2/2012 | Lee | H04N 5/23222 348/208.1 |
| 2012/0044344 | A1* | 2/2012 | Zheng | G01N 21/896 348/93 |
| 2012/0133889 | A1* | 5/2012 | Bergt | A61B 3/113 351/206 |
| 2012/0134598 | A1* | 5/2012 | Ovsiannikov | G01S 17/89 382/217 |
| 2012/0162403 | A1 | 6/2012 | Bae et al. | |
| 2012/0201430 | A1* | 8/2012 | Cambier | G06K 9/0061 382/110 |
| 2012/0212597 | A1* | 8/2012 | Hanna | G06K 9/00604 348/78 |
| 2012/0242820 | A1* | 9/2012 | Hanna | G06K 9/00597 348/78 |
| 2012/0271288 | A1* | 10/2012 | Marziliano | G06T 7/0046 606/6 |
| 2013/0063698 | A1* | 3/2013 | Akiba | A61B 3/12 351/206 |
| 2013/0088583 | A1 | 4/2013 | Northcott et al. | |
| 2013/0089240 | A1* | 4/2013 | Northcott | G06K 9/00604 382/117 |
| 2013/0162798 | A1* | 6/2013 | Hanna | A61B 3/14 348/78 |
| 2013/0162799 | A1* | 6/2013 | Hanna | A61B 5/117 348/78 |
| 2013/0300850 | A1* | 11/2013 | Millikan | A61B 5/0077 348/77 |
| 2013/0308095 | A1* | 11/2013 | Korb | A61B 3/101 351/206 |
| 2014/0112550 | A1* | 4/2014 | Hanna | G06K 9/00604 382/117 |
| 2014/0226707 | A1* | 8/2014 | Kaviani | H04L 25/03063 375/233 |
| 2015/0257929 | A1* | 9/2015 | Daxer | A61F 9/0079 606/3 |
| 2015/0304535 | A1* | 10/2015 | Smits | H04N 5/2258 348/78 |
| 2015/0347844 | A1* | 12/2015 | Min | G06K 9/00604 382/106 |

OTHER PUBLICATIONS

Kevin W. Bowyer, et al., "Image understanding for iris biometrics: A survey", Computer Vision and Image Understanding, 110 (2008), accepted Aug. 28, 2007, pp. 281-307.

John Daugman, "The importance of being random: statistical principles of iris recognition", Pattern Recognition 36 (2003), Received Dec. 21, 2001, pp. 279-291.

John Daugman, "How Iris Recognition Works", IEEE Transactions on Circuits and Systems for Video Technology, vol. 14, No. 1, Jan. 2004, pp. 21-30.

Ko Nishino, et al., "Corneal Imaging System: Environment from Eyes", International Journal of Computer Vision 70(1), pp. 23-40, 2006, accepted Nov. 17, 2005.

Dal-ho Cho, et al., "Pupil and Iris Localization for Iris Recognition in Mobile Phones", IEEE Computer Society, Proceedings of the Seventh ACIS International Conference on Software Engineering, Artificial Intelligence, Networking, and Parallel/Distributed Computing (SNPD'06), 2006, total 5 pages.

Stan Kurkovsky, et al., "Experiments with Simple Iris Recognition for Mobile Phones", 2010 Seventh International Conference on Information Technology, IEEE Computer Society, pp. 1293-1294.

Tae-Chan Kim, et al., "New Biometrics-Acquisition Method using Time-of-Flight Depth Camera", 2011 IEEE International Conference on Consumer Electronics (ICCE), pp. 721-722.

Robert Lange, 3D Time-of-Flight Distance Measurement with Custom Solid-State Image Sensors in CMOS/CCD-Technology, Ph.D. thesis, University of Siegen, 2000, total 223 pages.

Richard P. Wildes, "Iris Recognition: An Emerging Biometric Technology", Proceedings of the IEEE, vol. 85, No. 9, Sep. 1997, pp. 1348-1363.

Scotti, "Computational Intelligence Techniques for Reflections Identification in Iris Biometric Images", IEEE International Conference on Computational Intelligence for Measurement Systems and Applications, Jun. 2007, 5 pages total.

Kong, et al.; "Accurate Iris Segmentation Based on Novel Reflection and Eyelash Detection Model", Proceedings of 2001 International Symposium on Intelligent Multimedia, Video and Speech Processing, May 2001, 4 pages total.

Huang, et al.; "A New Iris Segmentation Method for Recognition", Proceedings of the 17th International Conference on Pattern Recognition, Aug. 2004, 4 pages total.

He, et al.; "Toward Accurate and Fast Iris Segmentation for Iris Biometrics", IEEE Transactions on Pattern Analysis and Machine Intelligence, Sep. 2009, vol. 31, No. 9, 15 pages total.

Tan, et al.; "Automated Segmentation of Iris Images Using Visible Wavelength Face Images", Computer Vision and Pattern Recognition Workshops, 2011 IEEE Computer Society Conference, Jun. 2011, 6 pages total.

* cited by examiner

IRIS RECOGNITION DEVICE AND MOBILE DEVICE HAVING THE SAME

CROSS-REFERENCE TO THE RELATED APPLICATION

This application claims priority from Korean Patent Application No. 10-2014-0034196 filed on Mar. 24, 2014, the entire contents of which are incorporated herein by reference in their entirety.

BACKGROUND

1. Field

Apparatuses and methods consistent with exemplary embodiments of the inventive concept relate to an iris recognition device, and more particularly, to an iris recognition device that removes noise in an iris image signal, such as a ghost generated by an ambient light, using sampling signals having different phases with one another and a mobile device having the same.

2. Description of the Related Art

Iris recognition is one of the most promising approaches for biometric authentication. The iris is the only internal organ that is easily captured by a camera from the outside of a body. Moreover, because iris patterns between the pupil and the sclera have rich textures with unique and stable features, biometric authentication with iris recognition has a higher recognition accuracy than other biometric signatures.

With this availability and accuracy, iris recognition has been used in many security applications. Especially, there have been attempts to apply iris recognition technology to the security of mobile phones. The security issue of mobile phone applications becomes critical for banking or shopping services. They require a reliable and easy method to protect against unauthorized access. In the case of bank transaction service by using a mobile phone, iris recognition is used for a high level of security.

SUMMARY

Various exemplary embodiments of the inventive concept provide an iris recognition device and a method of biometric authentication using the same which may remove noise in an image of the iris such as a ghost generated by ambient light.

The exemplary embodiments of the inventive concept also provide a mobile device having the iris recognition device.

The technical objectives of the inventive concept are not limited to the above disclosure, and other objectives may become apparent to those of ordinary skill in the art based on the following descriptions.

In accordance with an aspect of an exemplary embodiment, there is provided an iris recognition device which may include: a light source unit configured to transmit a light signal to an iris; and a light source receiver configured to receive a reflected light signal of an image of the iris from the iris, and remove an offset of the reflected light signal, corresponding to noise (e.g., a ghost) in the iris image, using a plurality of reference signals having different phases.

The light source receiver may be configured to generate a plurality of sampling signals by synchronizing the reflected light signal with the plurality of reference signals having different phases, and the lights source receiver may be configured to obtain information about the iris using the plurality of sampling signals to remove the offset.

The light source receiver may calculate an amplitude of the reflected light signal using the plurality of sampling signals.

The light source receiver may remove the offset using the amplitude of the reflected light signal.

The light source receiver may calculate the offset using the plurality of sampling signals.

The frequency of each of the plurality of sampling signals may be equal to that of the light signal.

The light source receiver may calculate a distance from the iris using the plurality of sampling signals.

The light signal transmitted by the light source unit may include a near infrared ray (NIR).

The offset may be generated by an ambient light.

In accordance with an aspect of another exemplary embodiment, there is provided a mobile device which may include the above iris recognition device and an application processor configured to control the iris recognition device.

In accordance with an aspect of still another exemplary embodiment, there is provided a method of biometric authentication using an iris recognition device. The method may include: transmitting a light signal to an iris and receiving a light signal reflected from the iris; generating a plurality of sampling signals by synchronizing the reflected light signal with a plurality of reference signals having different phases; removing an offset in the reflected light signal, corresponding to noise included in an iris image, by analyzing the sampling signals, thereby generating iris image data; and comparing the iris image data with pre-stored iris image data.

The reference signals may include photo-gate signals.

The removing the offset may be performed by calculating an amplitude of the reflected light signal using the plurality of sampling signals.

The above method may further include calculating a distance between the light source receiver and the iris using the plurality of sampling signals.

A frequency of each of the plurality of sampling signals may be equal to a frequency of the light signal.

BRIEF DESCRIPTION OF THE DRAWINGS

The foregoing and other features and advantages of the inventive concepts will be apparent from the more particular description of exemplary embodiments, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION OF THE EXEMPLARY EMBODIMENTS

Exemplary embodiments of the present inventive concept are described below in sufficient detail to enable those of ordinary skill in the art to embody and practice the inventive concept. It is important to understand that the inventive concept may be embodied in many alternate forms and should not be construed as limited to the exemplary embodiments set forth herein.

Various exemplary embodiments will now be described more fully with reference to the accompanying drawings. The inventive concept may, however, be embodied in different forms and should not be construed as limited to the embodiments set forth herein. Rather, these embodiments are provided so that this disclosure is thorough and complete and fully conveys the inventive concept to those skilled in the art. In the drawings, the sizes and relative sizes of layers and regions may be exaggerated for clarity.

It will be understood that, although the terms "first," "second," "A," "B," etc. may be used herein in reference to elements of the embodiments, such elements should not be construed as limited by these terms. For example, a first element could be termed a second element, and a second element could be termed a first element, without departing from the scope of the inventive concept. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe the embodiments is not intended to limit the scope of the inventive concept. The articles "a," "an," and "the" are singular in that they have a single referent, however the use of the singular form in the present document should not preclude the presence of more than one referent. In other words, elements of the embodiments referred to as singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which these embodiments belong. It will be further understood that terms in common usage should also be interpreted as is customary in the relevant art and not in an idealized or overly formal sense unless expressly so defined herein.

Meanwhile, when it is possible to implement any embodiment in any other way, a function or an operation specified in a specific block may be performed differently from a flow specified in a flowchart. For example, two consecutive blocks may actually perform the function or the operation simultaneously, and the two blocks may perform the function or the operation conversely according to a related operation or function.

The embodiments of the inventive concept will be described below with reference to attached drawings.

Figure 1:
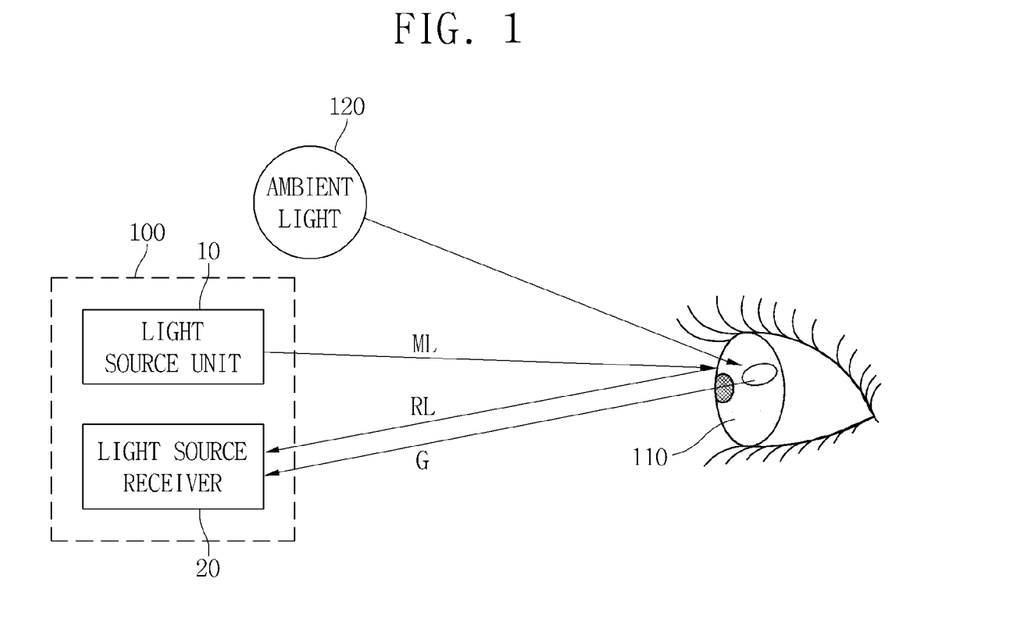
FIG. 1 is a block diagram illustrating an iris recognition device, according to an exemplary embodiment.

FIG. 1 is a block diagram illustrating an iris recognition device, according to an exemplary embodiment.

Referring to FIG. 1, an iris recognition device 100 according to an exemplary embodiment may transmit a modulated light signal ML to an iris 110, and receive a reflected light signal RL which is generated as the modulated light signal ML is reflected from an iris. According to an exemplary embodiment, the iris recognition device 100 may capture an image of an iris 110 illuminated by a near infrared ray (NIR) using a time-of-flight (ToF) sensor. The ToF sensor may correlate four sampling signals generated using the reflected light signal RL to obtain depth information (i.e., distance information from an object). Noise such as a ghost G may occur in an image of the iris 110 since an ambient light 120 is reflected off a cornea.

The ghost G may be removed through a correlation process. In this matter, the iris recognition device 100 includes a light source unit 10 and a light source receiver 20.

The light source unit 10 may modulate a light source to generate the modulated light signal ML. The light source unit 10 may transmit the modulated light source ML to the iris 110. According to an exemplary embodiment, the light source unit 10 may modulate an NIR and transmit the modulated NIR to the iris 110.

The light source receiver 20 may receive the reflected light signal RL or the ghost G generated by the ambient light 120.

The light source receiver 20 may receive the reflected light signal RL from the iris 110 in synchronization with four reference signals having different phases to be explained later. The light source receiver 20 calculates size information of the reflected light signal RL, and removes the ghost G generated by the ambient light 120 using the size information. According to an exemplary embodiment, the light source receiver 20 may include a ToF sensor or an electrical optical shutter. An operation of the iris recognition device 100 will be described with FIGS. 3 and 4 in detail.

Figure 2A:
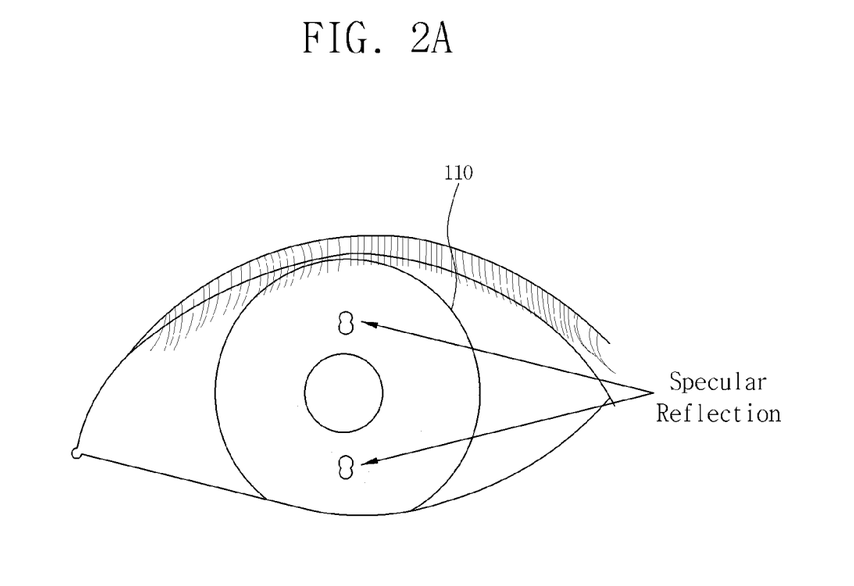
FIGS. 2A and 2B are images that capture an iris by the iris recognition device 100 shown in FIG. 1, according to an exemplary embodiment.
Figure 2B:
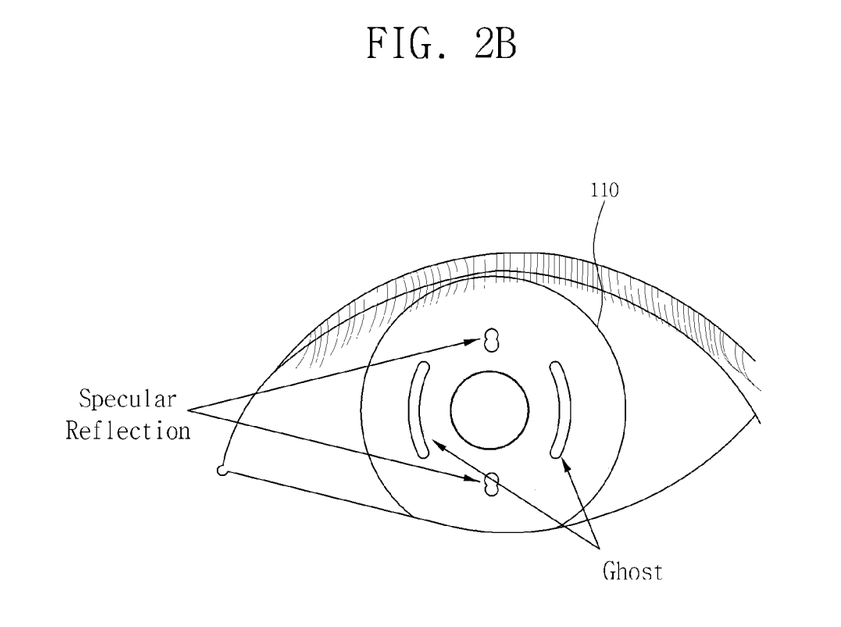

FIGS. 2A and 2B are images that capture an iris by the iris recognition device 100 shown in FIG. 1, according to exemplary embodiments.

Referring to FIGS. 1 and 2A, the light source unit 10 may use an NIR in order to ensure the quality of an image of the iris 110 in low illumination and minimize an effect of the ambient light 120. When the light source receiver 20 includes an NIR pass filter, the light source receiver 20 may nearly remove noise (i.e., the ghost G) generated by reflection from visible light in an indoor environment.

When the light source unit 10 transmits the modulated light signal ML to the iris 110, a specular reflection is the only reflection in the iris 110 if there is no ambient light 120. That is, only a reflection (i.e., a specular reflection) by the modulated light signal ML is output from the iris 110.

Referring to FIGS. 1 and 2B, there is a lot of light in an outdoor environment. Therefore, the size of the iris 110 may become smaller. Moreover, a light having various wavelengths may generate the ghost G reflected in an image of the iris 110.

The cornea is an optical outer layer capable of protecting the eye by covering the iris 110. The cornea has minor-like reflection characteristics. When the light source unit 10 transmits the modulated light signal ML to the iris 110 in an outdoor environment in which the ambient light 120 is abundant, the ghost G may occur in the iris 110 due to the specular reflection and the ambient light 120.

Figure 3:
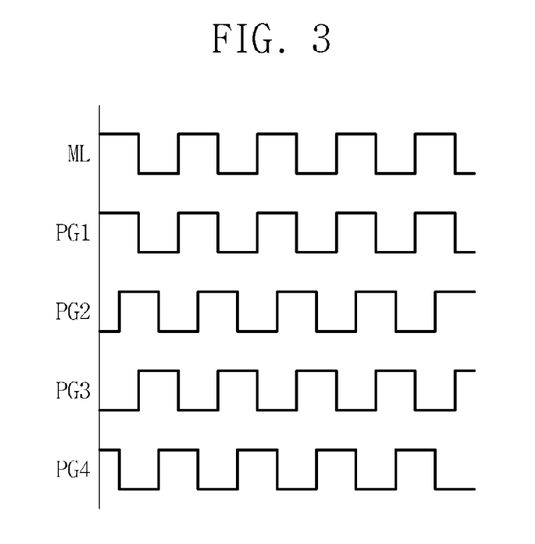
FIG. 3 is a timing diagram illustrating the modulated light signal shown in FIG. 1 and photo gate signals, according to an exemplary embodiment.

FIG. 3 is a timing diagram illustrating the modulated light signal shown in FIG. 1 and photo gate signals, according to an exemplary embodiment.

Referring to FIGS. 1 and 3, the light source unit 10 transmits the modulated light signal ML having a sinusoidal wave to the iris 110. The light source unit 10 may generate the modulated light signal ML to have a constant frequency. According to an exemplary embodiment, the light source unit 10 may set a frequency of the modulated light signal ML as 20 MHz.

The light source receiver 20 may generate the first to fourth photo gate signals PG1 to PG4 which are used as reference signals to measure a distance from the iris 110 or remove the ghost G generated by the ambient light 120. The first to fourth photo gate signals PG1 to PG4 are reception synchronization signals of the light source receiver 20.

The light source receiver 20 may receive the reflected light signal RL in synchronization with each of the first to fourth gate signals PG1 to PG4. That is, while each of the first to fourth photo gate signals PG1 to PG4 is activated, the light source receiver 20 may receive the reflected light signal RL.

The first photo gate signal PG1 has the same phase as the modulated light signal ML. The second photo gate signal PG2 has a phase difference of 90-degrees with the modulated light signal ML. The third photo gate signal PG3 has a phase difference of 180-degrees with the modulated light signal ML. And, the fourth photo gate signal PG4 has a phase difference of 270-degrees with the modulated light signal ML.

While the modulated light signal ML is reflected, a phase of the modulated light signal ML may be changed. For example, a phase difference occurs according to the distance from the iris 110. That is, the phase difference may be measured through comparing the modulated light signal ML with the reflected light signal RL. The light source receiver 20 may obtain amplitude information about the reflected light signal RL using the phase difference information. The light source receiver 20 may remove the ghost G using the amplitude information of the reflected light signal RL. A method of removing the ghost G using the amplitude information of the reflected light signal GL will be described with FIG. 4.

Figure 4:
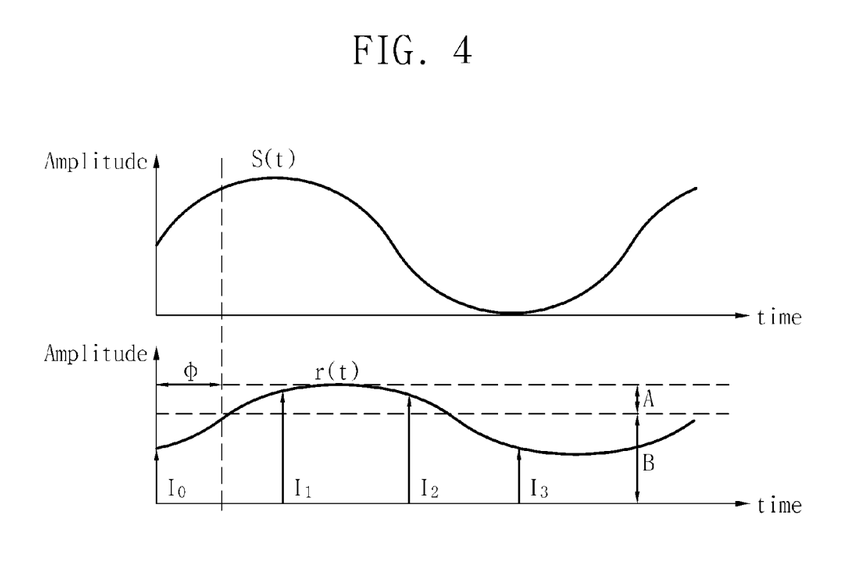
FIG. 4 is a timing diagram illustrating the modulated light signal ML shown in FIG. 1, and first to fourth sampling signals, according to an exemplary embodiment.

FIG. 4 is a timing diagram illustrating the modulated light signal ML shown in FIG. 1, and first to fourth sampling signals, according to an exemplary embodiment.

Referring to FIGS. 1, 3 and 4, the light source unit 10 may transmit the modulated light source ML to the iris 110. The modulated light signal ML may be represented in the form of a sinusoidal wave changing according to time. That is, when the modulated light signal ML is s(t), the modulated light signal ML may be represented by Equation 1.

$$s(t) = \cos(2\pi f t) \tag{1}$$

where f denotes a modulated frequency.

Further, the reflected light signal RL reflected from the iris 110 may be represented in the form of a sinusoidal wave changing according to time. That is, when the reflected light signal RL is r(t), the reflected light signal RL may be represented according to Equation 2.

$$r(t) = k + A\cos(2\pi f t - \Phi) \tag{2}$$

where A denotes an amplitude of the light signal according to the integration time. A may be determined by the reflectivity of an object and sensitivity of an image sensor. Due to scattering of light, A may decrease according to a distance. $\Phi$ denotes a phase shift according to the distance from the iris 110.

The light source unit 10 transmits s(t) to the iris 110. The light source receiver 20 receives the reflected r(t) from the iris 110. The light source receiver 20 receives r(t) in synchronization with each of the first to fourth photo gate signals PG1 to PG4.

The light source receiver 20 receives r(t) and synchronizes the received r(t) with the first to fourth photo gate signals PG1 to PG4 to generate the first to fourth sampling signal $I_0$, $I_1$, $I_2$ and $I_3$.

That is, the first sampling signal $I_0$ is generated by sampling r(t) in synchronization with the first photo gate signal PG1 having the same phase as s(t). The second sampling signal $I_1$ is generated by sampling r(t) in synchronization with the second photo gate signal PG2 having a phase difference of 90-degrees with s(t). The third sampling signal $I_2$ is generated by sampling r(t) in synchronization with the third photo gate signal PG3 having a phase difference of 180-degrees with s(t). Further, the fourth sampling signal $I_3$ is generated by sampling r(t) in synchronization with the fourth photo gate signal PG4 having a phase difference of 270-degrees with s(t).

The first to fourth sampling signals $I_0$ to $I_3$ may be represented in Equations 3(a) to 3(d).

$$I_0 = A\cos\Phi + B \tag{3(a)}$$

$$I_1 = A\sin\Phi + B \tag{3(b)}$$

$$I_2 = -A\cos\Phi + B \tag{3(c)}$$

$$I_3 = -A\sin\Phi + B \tag{3(d)}$$

where B denotes an offset or offset coefficient generated by the ambient light 120.

Equation 4 denotes a formula to calculate $\Phi$. That is, $\Phi$ may be computed using the first to fourth sampling signals $I_0$ to $I_3$ disclosed in Equations 3(a) to 3(d).

$$\phi = \tan^{-1}\left(\frac{I_3 - I_1}{I_0 - I_2}\right) + \pi \tag{4}$$

Equation 5 denotes a formula that calculates the distance d from the object using the frequency of the modulated light signal ML and the shifted phase $\Phi$. The distance d from the object may be computed using the speed c (i.e., $c = 3 \times 10^8$ m/s) of the modulated light signal ML.

$$d = \frac{C}{4\pi f}\phi \tag{5}$$

Equation 6 is a formula to calculate A.

$$A = \frac{1}{2}\sqrt{(I_3 - I_1)^2 + (I_0 - I_2)^2} \qquad (6)$$

Equation 7 is a formula to calculate B.

$$B = \frac{1}{4}\sum_{i=0}^{3} I_i \qquad (7)$$

The iris recognition device 100 according to the embodiment may calculate the amplitude A of the reflected light signal RL using the first to fourth sampling signals having different phases. The iris recognition device 100 may remove the offset B generated by the ambient light 120 using the amplitude A of the reflected light signal RL.

That is, the iris recognition device 100 may remove the offset B using the difference between two sampling signals. For example, the iris recognition device 100 may remove the offset B using the difference between the first and third sampling signals or the difference between the second and fourth sampling signals. Further, the iris recognition device 100 may remove the offset B using the difference between the first and third sampling signals and the difference between the second and fourth sampling signals.

Therefore, the iris recognition device 100 may remove the ghost G from the reflected light signal RL by removing the offset B generated by the ambient light 120.

Figure 5A:
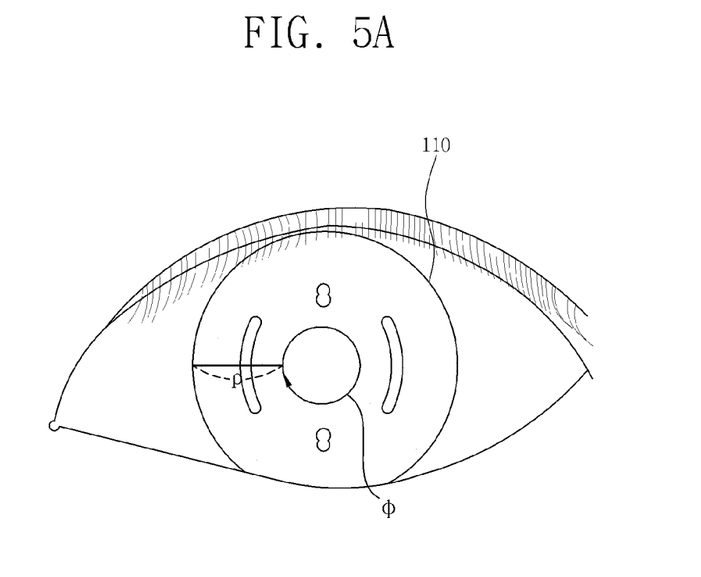
FIG. 5A is an example image capturing the iris by the iris recognition device in the presence of ambient light.

FIG. 5A is an example image capturing the iris by the iris recognition device in the presence of ambient light.

Referring to the FIGS. 1 and 5A, the iris recognition device 100 transmits the modulated light signal ML to the iris 110, and receives the reflected light signal RL. When there is the ambient light 120, the ghost G occurs in an image of the iris 110. Accordingly, the ghost G may occur in the iris 110 due to a specular reflection by the modulated light signal ML and the ambient light 120.

Figure 5B:
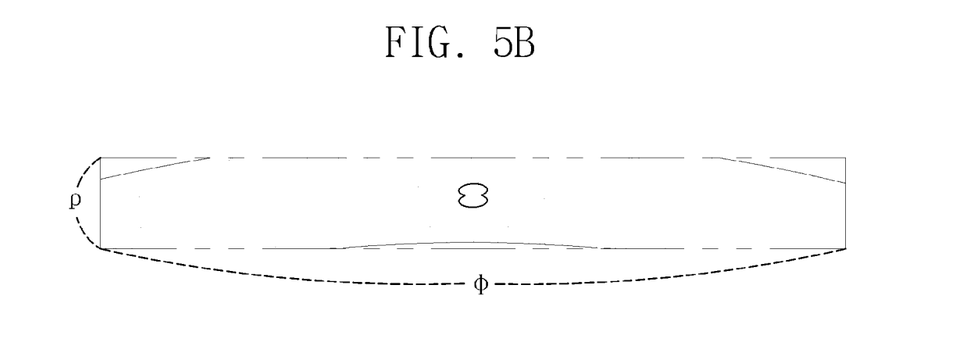
FIG. 5B is an example image by cutting and spreading an iris shown in FIG. 5A.

FIG. 5B is an example image by cutting and spreading an iris shown in FIG. 5A.

Referring to FIGS. 1, 5A and 5B, the iris recognition device 100 cuts the image of the iris 110 in a ρ direction. The iris recognition device 100 spreads the cut image in a Φ direction. The iris recognition device 100 converts the spread image to digital data.

The iris recognition device 100 may perform a biometric authorization through a correlation between the converted digital data and digital data for self-certification which may be pre-stored in the iris recognition device. When there is the ghost G in an image of the iris 110, the iris recognition device 100 may have difficulty in digitizing the region of the ghost G.

Figure 6A:
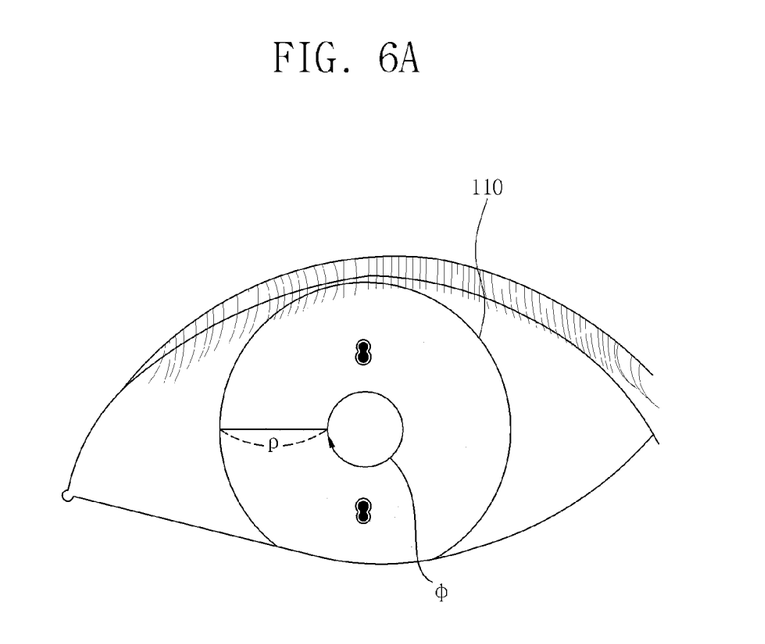
FIG. 6A is an example image in which a ghost G generated by an ambient light is removed.

FIG. 6A is an example image in which a ghost G generated by an ambient light is removed.

Referring to the FIGS. 1 and 6A, the iris recognition device 100 transmits the modulated light signal ML to the iris 110, and receives the reflected light signal RL. When there is no the ambient light 120, only the specular reflection generated by the modulated light signal ML occurs in an image of the iris 110.

Figure 6B:
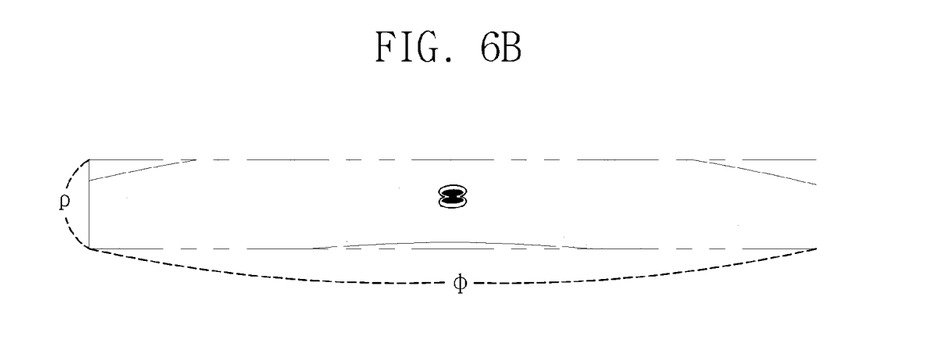
FIG. 6B is an example image by cutting and spreading an iris shown in FIG. 6A.

FIG. 6B is an example image by cutting and spreading an iris shown in FIG. 6A.

Referring to FIGS. 1, 6A and 6B, the iris recognition device 100 cuts the image of the iris 110 in the ρ direction. The iris recognition device 100 spreads the cut image in the Φ direction. The iris recognition device 100 converts the spread image to digital data.

There is no the ghost G in the image of the iris 110. Accordingly, when comparing FIG. 5B with FIG. 6B, the iris recognition device 100 may digitize a larger region in the iris 110.

The iris recognition device 100 may perform a biometric authorization through the correlation between the converted digital data and digital data for self-certification. For example, when the digital data for self-certification is similar to the converted digital data, the correlation may be high. Accordingly, the iris recognition device 100 may perform a self-certification process using the correlation.

Figure 7:
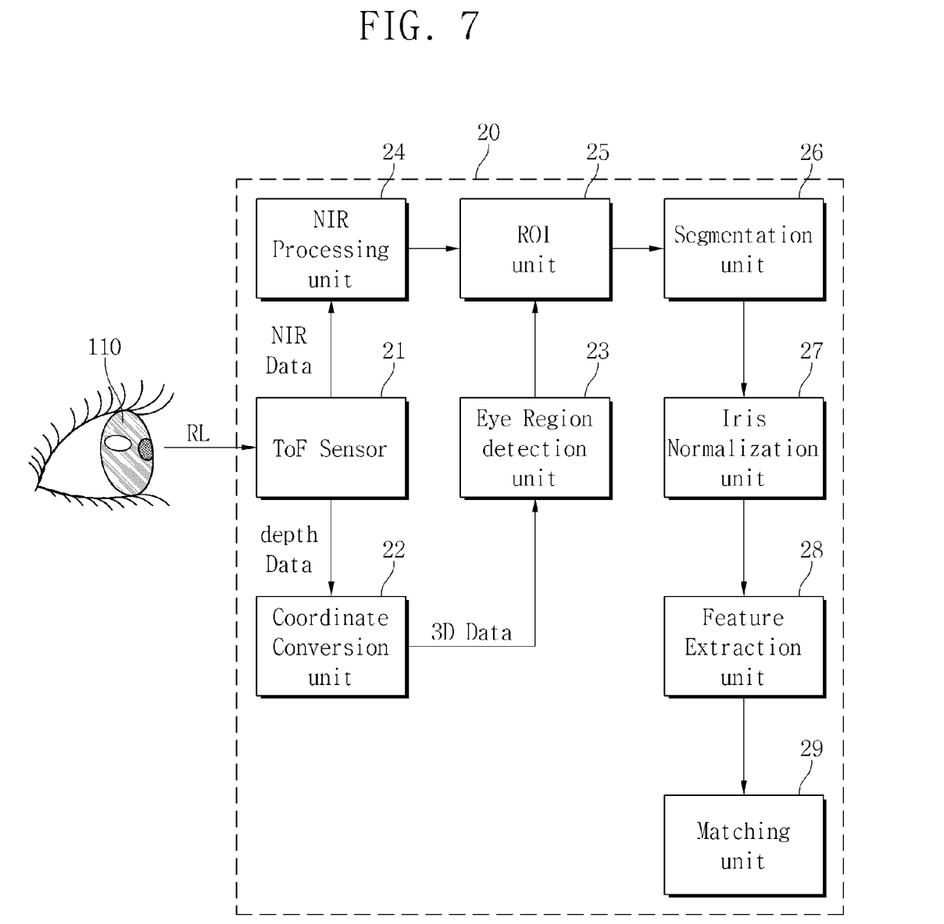
FIG. 7 is a block diagram illustrating the iris recognition device shown in FIG. 1, according to an exemplary embodiment.

FIG. 7 is a block diagram illustrating the iris recognition device shown in FIG. 1, according to an exemplary embodiment.

Referring to FIGS. 1 and 7, the iris recognition device 100 includes the light source unit 10 and the light source receiver 20. The light source receiver 20 includes a ToF sensor 21, a coordinate conversion unit 22, an eye region detection unit 23, an NIR processing unit 24, a region of interest (ROI) unit 25, a segmentation unit 26, an iris normalization unit 27, a feature extraction unit 28, and a matching unit 29.

The ToF sensor 21 may receive the reflected light signal RL from the iris 110. The ToF sensor 21 extracts depth data and NIR data from the reflected light signal RL. The ToF sensor 21 transfers the depth data, which is depth information from the iris 110, to the coordinate conversion unit 22. Further, the ToF sensor 21 transfers the NIR data, which is image information about the iris 110, to the NIR processing unit 24.

The coordinate conversion unit 22 converts coordinates of the depth information to generate three-dimension (3D) data. The eye region detection unit 23 detects an eye region using the 3D data. The NIR processing unit 24 may remove the ghost G generated by the ambient light 120 using the NIR data.

The ROI unit 25 aligns 3D data with a pre-defined reference model. The segmentation unit 26 may extract an ROI from the NIR data.

The iris normalization unit 27 normalizes the extracted ROI. The feature extraction unit 28 extracts features for a biometric authentication from the normalized ROI.

The matching unit 29 performs a biometric authentication using the extracted features. According to an exemplary embodiment, the matching unit 29 may perform a correlation process for biometric authentication.

Figure 8:
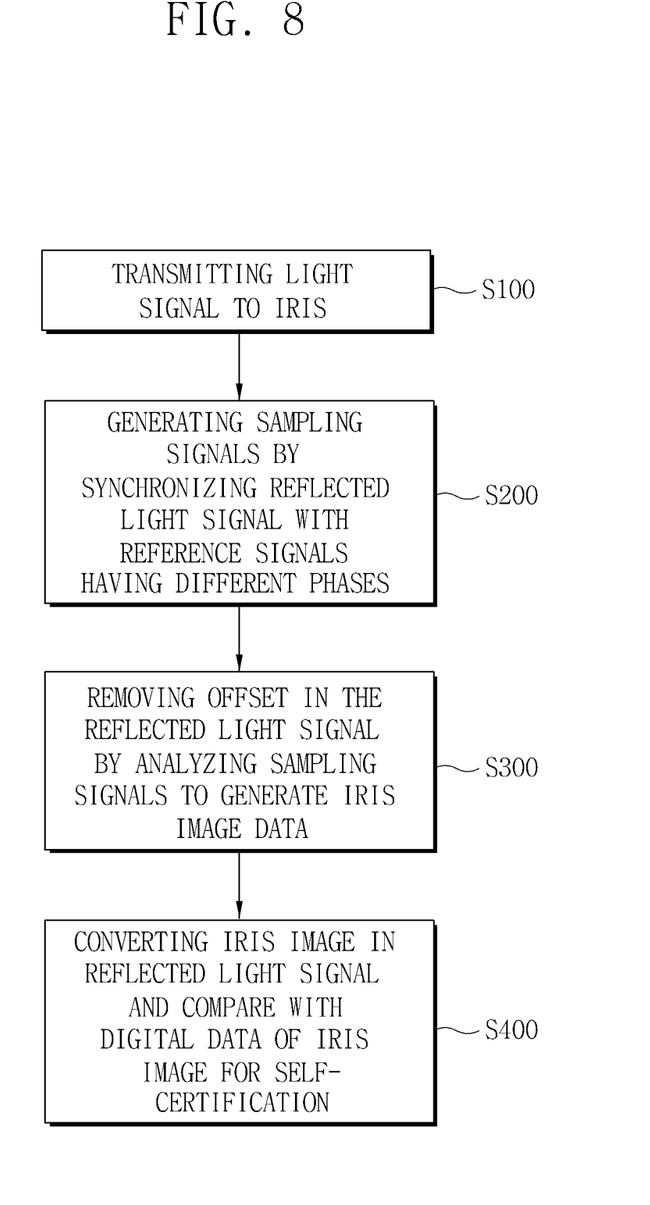
FIG. 8 is a flowchart explaining a method of biometric authentication using an iris recognition device, according to an exemplary embodiment.

FIG. 8 is a flowchart explaining a method of biometric authentication using an iris recognition device, according to an exemplary embodiment.

According to the biometric authentication method of FIG. 8, the iris recognition device transmits a light signal (e.g., a modulated signal ML) to an iris and receives a light signal RL reflected from the iris (S100). The iris recognition device generates four sampling signals by synchronizing the reflected light signal RL with four reference signals having different phases (S200). Since the reflected light signal RL may include an offset represented by noise such as a ghost occurring due to an ambient light, the iris recognition device removes the offset by analyzing the four sampling signals (S300). After removing the offset, the iris recognition device converts image of the iris included in the reflected light signal RL to digital data, and compares the converted data with digital data of the iris for self-certification (S400).

Figure 9:
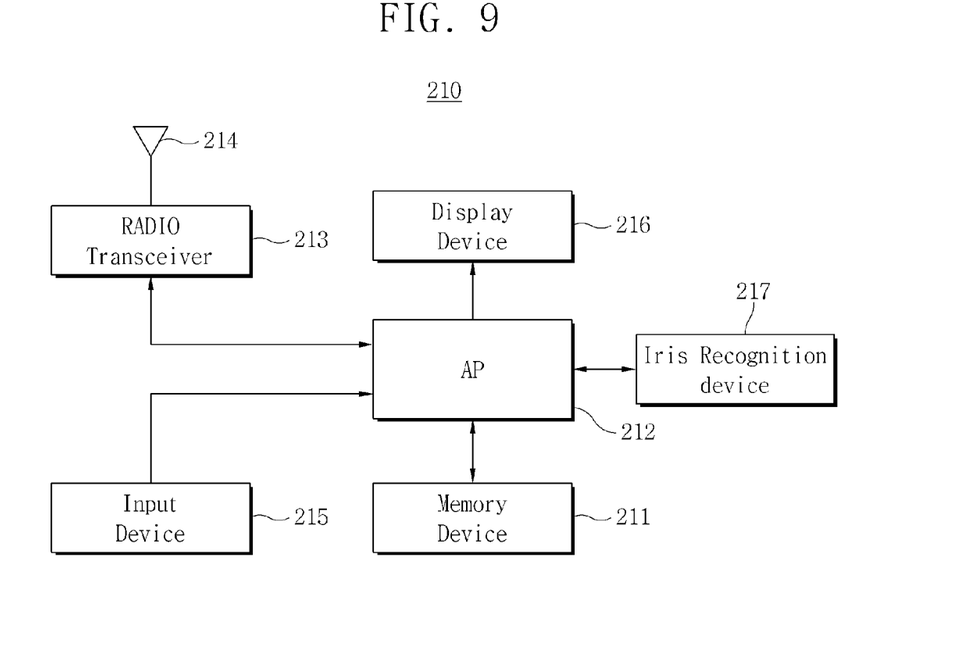
FIG. 9 is a block diagram illustrating a mobile device including the iris recognition device shown in FIG. 1 in accordance with an exemplary embodiment.

FIG. 9 is a block diagram illustrating a mobile device including the iris recognition device shown in FIG. 1 in accordance with an exemplary embodiment.

Referring to FIG. 9, a mobile device 210 may be embodied to a smart-phone, a personal digital assistant (PDA), a portable multimedia player (PMP), an MP3 player, or an MP4 player.

The mobile device 210 may include a memory device 211, an application processor (AP) 212 including a memory controller for controlling the memory device 211, a radio transceiver 213, an antenna 214, an input device 215, and a display device 216.

The radio transceiver 213 may transmit or receive a radio signal through the antenna 214. For example, the radio transceiver 213 may convert the radio signal received through the antenna 214 into a signal which may be processed in the AP 212.

Accordingly, the AP 212 may process a signal output from the radio transceiver 213, and transmit the processed signal to the display device 216. Further, the radio transceiver 213 may convert a signal output from the AP 212 into a radio signal, and output the converted radio signal to an external device through the antenna 214.

As the input device 215 is a device for inputting a control signal for controlling an operation of the AP 212 or data processed by the AP 212, and may be embodied as a pointing device such as a touchpad and a computer mouse, a keypad, or a keyboard.

Further, the mobile device 210 may further include an iris recognition device 217 for biometric authentication. The AP 212 may perform a biometric authentication method through the iris recognition device 217. For example, when a finance application is performed in the mobile device 210, the iris recognition device 217 may perform a biometric authentication method. According to the embodiments, the iris recognition device 217 may be implemented with the iris recognition device 100 shown in FIG. 1.

Figure 10:
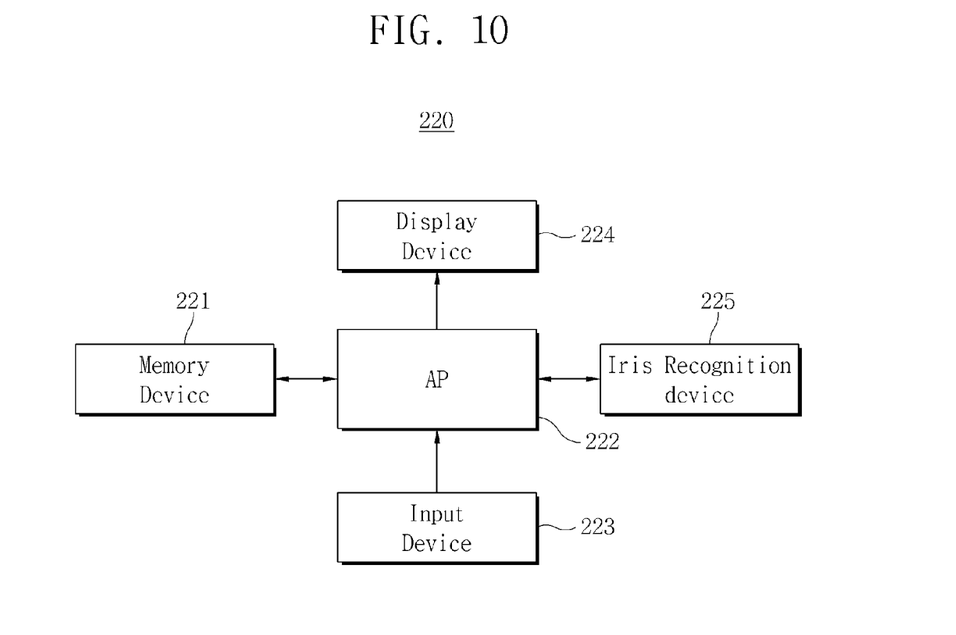
FIG. 10 is a block diagram illustrating a mobile device including the iris recognition device shown in FIG. 1 in accordance with another exemplary embodiment.

FIG. 10 is a block diagram illustrating a mobile device including the iris recognition device shown in FIG. 1 in accordance with another exemplary embodiment.

Referring to FIG. 10, a mobile device 220 may be a personal computer (PC), a network server, a tablet PC, a netbook, or an e-reader.

The mobile device 220 includes a memory device 221, an AP 222 including a memory controller for controlling a data processing operation of the memory device 221, an input device 223, and a display device 224.

The AP 222 may display data stored in the memory device 221 on the display device 224 according to data input through the input device 223. For example, the input device 223 may be a pointing device such as a touchpad or a computer mouse, a keypad, or a keyboard. The application processor 222 may control overall operations of the mobile device 220.

Further, the mobile device 220 may further include an iris recognition device 225 for biometric authentication. The AP 222 may perform a biometric authentication method through the iris recognition device 225. According to the embodiments, the iris recognition device 225 may be implemented with the iris recognition device 100 shown in FIG. 1.

Figure 11:
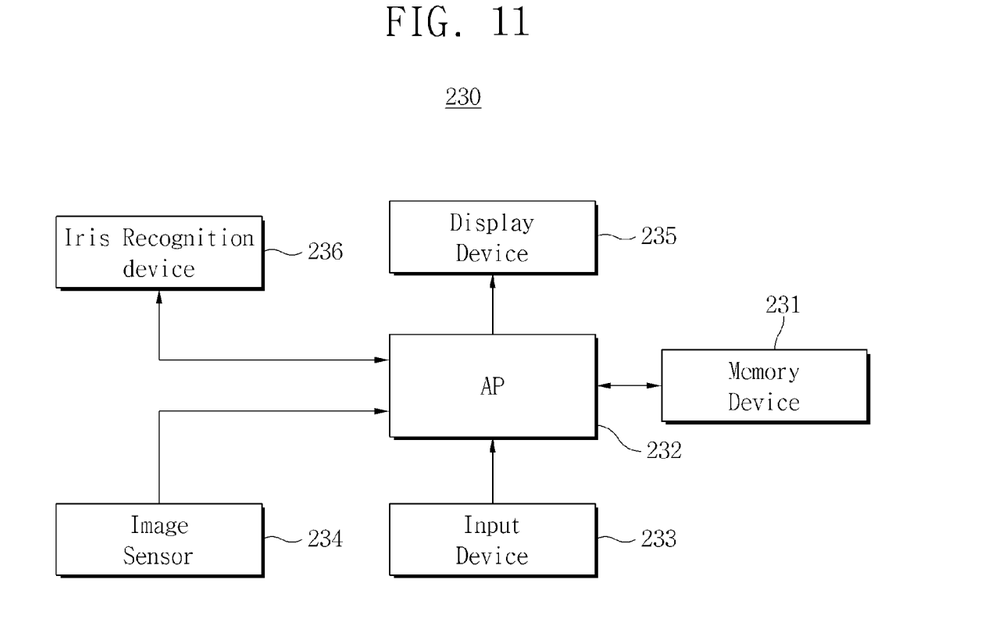
FIG. 11 is a block diagram illustrating a mobile device including the iris recognition device shown in FIG. 1 in accordance with still another exemplary embodiment.

FIG. 11 is a block diagram illustrating a mobile device including the iris recognition device shown in FIG. 1 in accordance with still another exemplary embodiment.

Referring to FIG. 10, a mobile device 230 may be an image processing device, for example, a digital camera or a mobile phone having the digital camera, a smartphone, or a tablet PC.

The mobile device 230 may include a memory device 231, an AP 232 including a memory controller for controlling a data processing operation, for example, a write operation or a read operation, of the memory device 231, an input device 233, an image sensor 234, a display device 235, and an iris recognition device 236.

The image sensor 234 converts an optical image into digital signals, and the converted digital signals are transmitted to the AP 232. According to the control of the AP 232, the converted digital signals may be displayed on the display device 235, or stored in the memory device 231.

The application processor 232 may perform a biometric authentication method through the iris recognition device 236. In one embodiment, the iris recognition device 236 may be implemented with the iris recognition device 100 shown in FIG. 1.

Figure 12:
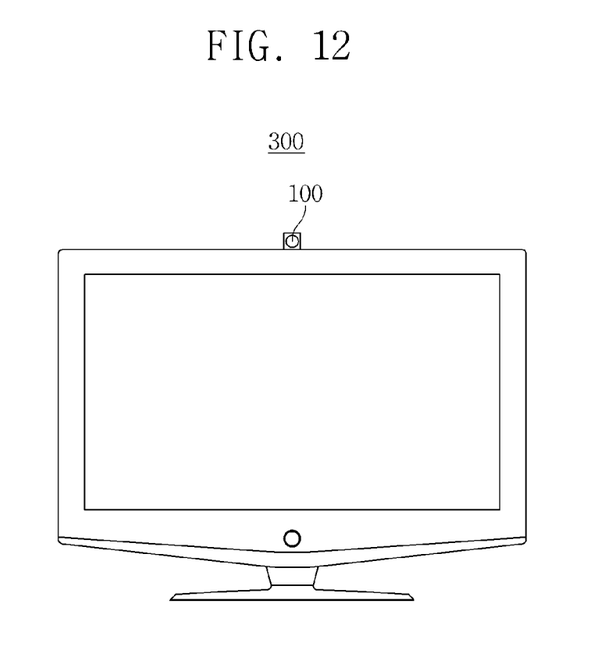
FIG. 12 is a view illustrating a display device including the iris recognition device shown in FIG. 1 in accordance with an exemplary embodiment.

FIG. 12 is a view illustrating a display device including the iris recognition device shown in FIG. 1 in accordance with an exemplary embodiment.

Referring to FIGS. 1 and 11, a display device 300 may be a display device or the like installed in a smart TV, a monitor, or various mobile devices.

The display device 300 may include the iris recognition device 100 shown in FIG. 1. According to an exemplary embodiment, the iris recognition device 100 may be a ToF camera device.

When the display device 300 is the smart TV, various applications may be installed in the display device 300. The display device 300 may use the iris recognition device 100 as a self-authorization method. For example, a user may perform a financial application installed in the display device 300. The iris recognition device 100 photographs an iris of the user for self-authorization. In this matter, the iris recognition device 100 may identify oneself.

The iris recognition device according to the above embodiments may remove a ghost generated by an ambient light from an image of an iris.

The above embodiments may be applied to an iris recognition device and a mobile device having the same.

The foregoing is illustrative of various exemplary embodiments and is not to be construed as limiting thereof. Although a few exemplary embodiments have been described, those skilled in the art will readily appreciate that many modifications are possible without materially departing from the novel teachings and advantages. Accordingly, all such modifications are intended to be included within the scope of this inventive concept as defined in the claims.

What is claimed is:

1. An iris recognition device, comprising:
   a light source unit configured to transmit a light signal to an iris; and
   a light source receiver configured to receive a reflected light signal of an image of the iris from the iris, generate a plurality of sampling signals by synchronizing the reflected light signal with a plurality of reference signals having different phases, and remove an offset of the reflected light signal, corresponding to noise in the iris image, using the sampling signals.

2. The iris recognition device of claim 1,
   wherein the light source receiver is configured to obtain information about the iris using the plurality of sampling signals to remove the offset.

3. The iris recognition device of claim 1, wherein the sampling signals comprise at least first to fourth sampling signals, and the reference signals comprise at least first to fourth reference signals,
   wherein the first sampling signal is generated by sampling the reflected light signal in synchronization with the first reference signal having the same phase as the light signal, wherein the second sampling signal is generated by sampling the reflected light signal in synchronization with the second reference signal having a phase difference of 90-degrees with the light signal, wherein the third sampling signal is generated by sampling the reflected light signal in synchronization with the third reference signal having a phase difference of 180-degrees with the light signal, and wherein the fourth sampling signal is generated by sampling the reflected light signal in synchronization with the fourth reference signal having a phase difference of 270-degrees with the light signal.

4. The iris recognition device of claim 1,
wherein the light source receiver is configured to calculate an amplitude of the reflected light signal using the plurality of sampling signals.

5. The iris recognition device of claim 4, wherein the light source receiver is configured to remove the offset using the amplitude of the reflected light signal.

6. The iris recognition device of claim 1,
wherein the light source receiver is configured to calculate the offset using the plurality of sampling signals.

7. The iris recognition device of claim 1,
wherein a frequency of each of the plurality of sampling signals is equal to a frequency of the light signal.

8. The iris recognition device of claim 1,
wherein the light source receiver is configured to calculate a distance between the light source receiver and the iris using the plurality of sampling signals.

9. The iris recognition device of claim 1, wherein the light signal transmitted by the light source unit comprises a near infrared ray (NIR).

10. The iris recognition device of claim 1, wherein the offset is generated by an ambient light.

11. A mobile device comprising:
an iris recognition device; and
an application processor configured to control the iris recognition device,
a light source unit configured to transmit a light signal to an iris; and
a light source receiver configured to receive a reflected light signal of an image of the iris from the iris, generate a plurality of sampling signals by synchronizing the reflected light signal with a plurality of reference signals having different phases, and remove an offset of the reflected light signal, corresponding to noise in the iris image, using the sampling signals.

12. The mobile device of claim 11,
wherein the lights source receiver is configured to obtain information about the iris using the plurality of sampling signals to remove the offset.

13. The mobile device of claim 11, wherein the sampling signals comprise at least first to fourth sampling signals, and the reference signals comprise at least first to fourth reference signals, wherein a first sampling signal is generated by sampling the reflected light signal in synchronization with a first reference signal having the same phase as the light signal, wherein a second sampling signal is generated by sampling the reflected light signal in synchronization with a second reference signal having a phase difference of 90-degrees with the light signal, wherein a third sampling signal is generated by sampling the reflected light signal in synchronization with a third reference signal having a phase difference of 180-degrees with the light signal, and wherein a fourth sampling signal is generated by sampling the reflected light signal in synchronization with a fourth reference signal having a phase difference of 270-degrees with the light signal.

14. The mobile device of claim 11,
wherein the light source receiver is configured to calculate an amplitude of the reflected light signal using the plurality of sampling signals, and
wherein the light source receiver is configured to remove the offset using the amplitude about the reflected light signal.

15. The mobile device of claim 11, wherein the light signal transmitted by the light source unit comprises a near infrared ray (NIR).

16. A method of biometric authentication using an iris recognition device, the method comprising:
transmitting a light signal to an iris and receiving a light signal reflected from the iris;
generating a plurality of sampling signals by synchronizing the reflected light signal with a plurality of reference signals having different phases;
removing an offset in the reflected light signal, corresponding to noise in an iris image, by using parameters obtained from correlating the sampling signals, thereby generating iris image data; and
comparing the iris image data with pre-stored iris image data.

17. The method of claim 16, wherein the reference signals comprises photo-gate signals.

18. The method of claim 16, wherein the parameters comprise an amplitude of the reflected light signal obtained from the correlating the sampling signals.

19. The method of claim 18, wherein the parameters comprise a distance between the light source receiver and the iris obtained from the correlating the sampling signals.

20. The method of claim 16, wherein a frequency of each of the plurality of sampling signals is equal to a frequency of the light signal.

* * * * *